US010831175B2

(12) United States Patent
Yeoman et al.

(10) Patent No.: US 10,831,175 B2
(45) Date of Patent: Nov. 10, 2020

(54) METHOD FOR CONFIGURING A MACHINE FOR PRODUCTION OF A THREAD AND APPARATUS FOR PRODUCING A THREAD

(71) Applicant: JAGUAR LAND ROVER LIMITED, Warwickshire (GB)

(72) Inventors: Stephen Yeoman, Coventry (GB); Ben Onley, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 191 days.

(21) Appl. No.: 16/311,346

(22) PCT Filed: May 17, 2017

(86) PCT No.: PCT/EP2017/061887
§ 371 (c)(1),
(2) Date: Dec. 19, 2018

(87) PCT Pub. No.: WO2018/001633
PCT Pub. Date: Jan. 4, 2018

(65) Prior Publication Data
US 2019/0235468 A1    Aug. 1, 2019

(30) Foreign Application Priority Data

Jun. 28, 2016  (GB) .................................. 1611184.1

(51) Int. Cl.
*B23B 49/00* (2006.01)
*G05B 19/402* (2006.01)
(Continued)

(52) U.S. Cl.
CPC ............. *G05B 19/402* (2013.01); *B23G 1/16* (2013.01); *B23G 7/00* (2013.01); *G05B 19/186* (2013.01);
(Continued)

(58) Field of Classification Search
CPC ...... G01B 19/402; G05B 19/186; H01T 13/08
(Continued)

(56) References Cited

U.S. PATENT DOCUMENTS 2,517,237 A * 8/1950 Porter .................... G01B 3/303
33/562
4,965,937 A * 10/1990 Hill ....................... E21B 17/006
33/199 R
(Continued)

FOREIGN PATENT DOCUMENTS

DE        3304644 A1    8/1984
DE        3426548 A1    1/1986
(Continued)

OTHER PUBLICATIONS

Combined Search and Examination Report under Sections 17 and 18(3) for Application No. GB1611184.1 dated Dec. 19, 2016.
(Continued)

*Primary Examiner* — George B Bennett
(74) *Attorney, Agent, or Firm* — Carlson, Gaskey & Olds

(57) ABSTRACT

A method of configuring a machine (201) for production of a thread, having a pitch (227), on a workpiece (310), the machine (201) comprising: a tool (220) having a thread (223) centred on a first axis (250) and comprising one or more thread-producing peaks (225) for producing the thread having the pitch (227); and a tool holder (210) holding the tool (220), the method comprising: determining a first distance (441), in a first direction (260) parallel to the first axis (250), from a reference position (412) of the tool holder (210) to a first thread-producing peak (226) on the tool (220) when said tool (220) is held in the tool holder (210); and setting a first configuration (401) of the machine (201) wherein the reference position (412) of the tool holder (210) has a displacement (440) parallel to the first axis (250) from a reference position (411) of the workpiece (310) depending
(Continued)

only upon: the determined first distance (441); a translation (443) parallel to the first axis (250) to account for an angular offset (340) between the first thread-producing peak (226) and a desired thread start position (311) on the workpiece (310); and an integer multiple (444) of the pitch (227).

16 Claims, 8 Drawing Sheets

(51) Int. Cl.
  *G05B 19/18* (2006.01)
  *H01T 13/08* (2006.01)
  *B23G 1/16* (2006.01)
  *B23G 7/00* (2006.01)

(52) U.S. Cl.
  CPC .......... *H01T 13/08* (2013.01); *B23G 2240/56* (2013.01); *G05B 2219/45216* (2013.01)

(58) Field of Classification Search
  USPC .................................................. 33/628, 629
  See application file for complete search history.

(56) References Cited

U.S. PATENT DOCUMENTS

| | | | | |
|---|---|---|---|---|
| 5,182,862 | A * | 2/1993 | Frank | G01B 5/204 33/199 R |
| 5,459,940 | A * | 10/1995 | McKenzie | G01M 15/06 33/601 |
| 6,289,595 | B1 * | 9/2001 | Galestien | G01B 5/204 33/199 R |
| 2002/0059736 | A1 * | 5/2002 | Vencill | G01B 5/146 33/832 |
| 2003/0101602 | A1 * | 6/2003 | Galestien | G01B 5/204 33/199 R |
| 2004/0179906 | A1 | 9/2004 | Hughes, Jr. et al. | |
| 2006/0064886 | A1 * | 3/2006 | Yeeles | G01B 5/204 33/199 B |
| 2007/0240318 | A1 * | 10/2007 | Matsumiya | G01B 5/204 33/199 R |
| 2010/0093246 | A1 * | 4/2010 | Honda | H01T 13/38 445/3 |
| 2011/0314687 | A1 * | 12/2011 | Ozeki | H01T 21/06 33/613 |
| 2013/0067753 | A1 * | 3/2013 | Diehl | G01B 3/36 33/199 R |
| 2016/0303672 | A1 * | 10/2016 | Onley | B23G 7/00 |
| 2018/0281090 | A1 * | 10/2018 | Watanabe | B23G 1/02 |

FOREIGN PATENT DOCUMENTS

| | | |
|---|---|---|
| JP | 2012240179 A | 12/2012 |
| JP | 2012243697 A | 12/2012 |
| JP | 2016203340 A | 12/2016 |
| JP | 2016203341 A | 12/2016 |
| WO | 2015/075109 A2 | 5/2015 |

OTHER PUBLICATIONS

International Search Report and Written Opinion of the International Searching Authority for International application No. PCT/EP2017/061887 dated Aug. 22, 2017.

* cited by examiner

METHOD FOR CONFIGURING A MACHINE FOR PRODUCTION OF A THREAD AND APPARATUS FOR PRODUCING A THREAD

TECHNICAL FIELD

The present disclosure relates to a method for configuring a machine for production of a thread. In particular, but not exclusively it relates to a method for configuring a machine for production of a thread in a bore in a cylinder head of an internal combustion engine configured to receive a spark plug.

Aspects of the invention relate to an apparatus, a method, and a computer program.

BACKGROUND

Internal or external threads are machined with a reliably oriented thread start position so that when two components are screwed together to a given tightness, one has a predetermined orientation with respect to the other.

It is known to use computerised numerical control (CNC) machines to produce threads in mass manufacture. CNC machines are controlled to rotate and move tools at particular speeds and to move in particular directions. Providing a tool where the length of the tool and its angular position are both guaranteed with great precision, sufficient to determine the start position of thread production, is difficult and prohibitively expensive to achieve.

It is known to program a CNC machine to cut a trial thread in a first workpiece, determine where the thread starts, and then adjust the operation of the CNC machine so that in subsequent workpieces the thread is formed in the correct orientation. However, this creates unnecessary scrap and increases the time it takes to configure the CNC machine for each new machining cycle. Further, manual adjustment introduces human error where the CNC machine is not set correctly. This would lead to unacceptable levels of scrap parts, including expensive manufactured components.

It is an aim of the present invention to address these known problems by configuring a machine for the production of a thread.

SUMMARY OF THE INVENTION

Aspects and embodiments of the invention provide an apparatus, a method, and a computer program as claimed in the appended claims.

According to an aspect of the invention there is provided a method of configuring a machine for production of a thread, having a pitch, on a workpiece. The machine comprises: a tool having a thread centred on a first axis and comprising one or more thread-producing peaks for producing the thread having the pitch; and a tool holder holding the tool. The method comprises: determining a first distance, in a first direction parallel to the first axis, from a reference position of the tool holder to a first thread-producing peak on the tool when said tool is held in the tool holder; and setting a first configuration of the machine wherein the reference position of the tool holder has a displacement parallel to the first axis from a reference position of the workpiece depending only upon: the determined first distance; a translation parallel to the first axis to account for an angular offset between the first thread-producing peak and a desired thread start position on the workpiece; and an integer multiple of the pitch.

This provides the advantage that minimal steps are involved in setting a configuration of a machine that will produce a correctly oriented thread. This reduces time, especially in mass manufacturing.

The pitch refers to a distance, parallel to the first axis, between two points on the thread angularly offset by an angle of $2\pi$ radians.

It is to be appreciated that the first thread-producing peak may be any one of the one or more thread-producing peaks and the desired thread start position on the workpiece and the reference position of the workpiece are comprised in a first plane, orthogonal to the first axis.

No further measurements are made in order to set the first configuration of the machine.

In some, but not necessarily all, examples, a thread start position on the tool is angularly offset relative to the first thread-producing peak.

The angular offset between the first thread-producing peak and the desired thread start position on the workpiece is the sum of: a first angular offset between a target orientation of a spindle in the machine in the first configuration and the desired thread start position on the workpiece; and a second angular offset between the first thread-producing peak and the target orientation of the spindle in the machine in the first configuration.

The second angular offset is determined by: viewing the tool along a third direction, perpendicular to the first direction, to detect a first thread-producing peak, wherein the third direction has a known orientation relative to the target orientation of a spindle in the machine in the first configuration; rotating the tool by a measured angle until the first thread-producing peak is detected; and using the measured angle and the known orientation of the third direction relative to the target orientation of a spindle in the machine in the first configuration to calculate the second angular offset.

In some, but not necessarily all, examples, the second angular offset is determined in a tool pre-setter machine.

When the tool and the tool holder are moved from the first configuration in the first direction towards the workpiece along the first axis, for every distance of one pitch the tool is moved along the first axis, the tool is configured to perform one complete rotation about the first axis.

In some, but not necessarily all, examples, the tool holder is moveable only parallel to the base vectors of a Cartesian co-ordinate space and is rotatable about the first axis.

In some, but not necessarily all, examples, setting the first configuration of the machine comprises aligning a first virtual thread and a second virtual thread so that they form a single continuous virtual thread. The first virtual thread extends from the first thread-producing peak on the tool and has a first thread axis extending in the first direction and aligned with the first axis. The second virtual thread extends from the desired thread start position on the workpiece and has a second thread axis extending in a second direction, opposite the first direction, and aligned with the first axis. The first virtual thread and the second virtual thread have the same pitch.

The base unit for distances in the method is the pitch. This provides the advantage of determining distances relative to a position of alignment of the first virtual thread and the second virtual thread.

In some, but not necessarily all, examples, the tool is a thread-forming tool and the method is a method of forming a thread on a workpiece by deformation of material and not removal of material. This provides an advantage of producing a stronger thread because the material of the workpiece is deformed so that the grain of the material is aligned with the desired geometry.

In some, but not necessarily all, examples, the workpiece is a bore and the bore may be a first bore in an engine cylinder head and is configured to receive a spark plug.

In some, but not necessarily all, examples, the first bore in the engine cylinder head is machined from an outer surface of the engine cylinder head.

In some, but not necessarily all, examples, a tool is used in the machine to produce a seating face around the first bore from a cover side of an engine cylinder head, said seating face being machined from an outer surface of the engine cylinder head. Machining the first and second bores from the same surface of the engine cylinder head provides the advantage of reducing machine cycle time and improving the accuracy with which features of the engine cylinder head are produced relative to each other because the engine cylinder head does not need to be turned in the machine.

In some, but not necessarily all, examples, the desired thread start position on the workpiece is on the seating face on the workpiece.

In some, but not necessarily all, examples, the machine is a computerised numerical control (CNC) machine.

According to another aspect of the invention there is provided an apparatus for producing a thread, having a pitch, on a workpiece. The apparatus comprises: a tool holder for holding a tool having a thread centred on a first axis and comprising one or more thread-producing peaks for producing the thread having the pitch; means for determining a first distance, in a first direction parallel to the first axis, from a reference position of the tool holder to a first thread-producing peak on the tool when said tool is held in the tool holder; and means for setting a first configuration of the apparatus wherein the reference position of the tool holder has a displacement parallel to the first axis from the workpiece depending only upon: the determined first distance; a translation parallel to the first axis to account for an angular offset between the first thread-producing peak and a desired thread start position on the workpiece; and an integer multiple of the pitch.

According to a further aspect of the invention there is provided a method of configuring a machine for production of a thread, having a pitch, on a workpiece, the machine comprising: a spindle centred on a first axis and rotatable about the first axis; a tool having a thread centred on the first axis and comprising one or more thread-producing peaks for producing the thread having the pitch; and a tool holder holding the tool and coupling the tool to the spindle. The method comprises: determining a first distance, in a first direction parallel to the first axis, from a reference position of the tool holder to a first thread-producing peak on the tool when said tool is held in the tool holder; and setting a first configuration of the machine. In this further aspect of the invention, in the first configuration of the machine, the reference position of the tool holder has a displacement parallel to the first axis from a reference position of the workpiece depending only upon: the determined first distance; and an integer multiple of the pitch. Additionally, in the first configuration of the machine, a target orientation of the spindle is set such that an angular offset between the first thread-producing peak and a desired thread start position on the workpiece is a multiple of $2\pi$ radians.

According to a further aspect of the invention there is provided a method of arranging the position of a spark plug at a predetermined angular position in a cylinder head of an internal combustion engine, comprising: providing spark plugs with predetermined angular positions of ground electrodes with respect to a thread employed to secure the spark plug in the cylinder head; and producing a bore in the cylinder head to receive said spark plugs, said bore having a thread with a predetermined desired thread start position, using the method of configuring a machine for production of a thread, having a pitch, on a workpiece.

According to a further aspect of the invention there is provided a computer program, which, when run on a computer, enables performance of the method as described herein.

According to a further aspect of the invention there is provided an internal combustion engine produced by the method described herein or the apparatus as described herein.

According to a further aspect of the invention there is provided a vehicle comprising the internal combustion engine as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
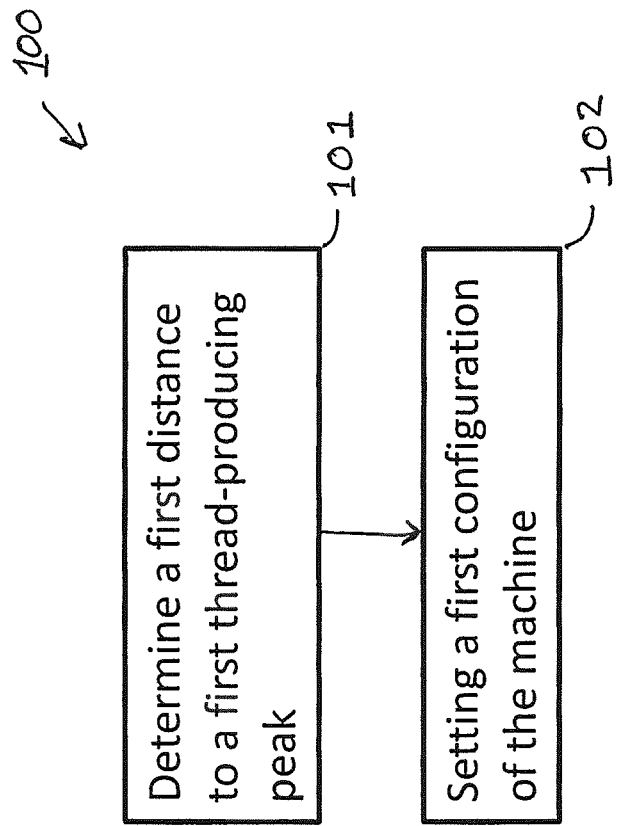
FIG. 1 illustrates an example of a method.

The Figures illustrate a method of configuring a machine 201 for production of a workpiece thread, having a pitch 227, on a workpiece 310, the machine 201 comprising: a tool 220 having a tool thread 223 centred on a first axis 250 and comprising one or more thread-producing peaks 225 for producing the workpiece thread having the pitch 227; and a tool holder 210 holding the tool 220, the method comprising: determining a first distance 441, in a first direction 260 parallel to the first axis 250, from a reference position 412 of the tool holder 210 to a first thread-producing peak 226 on the tool 220 when said tool 220 is held in the tool holder 210; and setting a first configuration 401 of the machine 201 wherein the reference position 412 of the tool holder 210 has a displacement 440 parallel to the first axis 250 from a reference position 411 of the workpiece 310 depending only upon: the determined first distance 441; a translation 443 parallel to the first axis 250 to account for an angular offset 340 between the first thread-producing peak 226 and a desired workpiece thread start position 311 on the workpiece 310; and an integer multiple 444 of the pitch 227.

Figure 2:
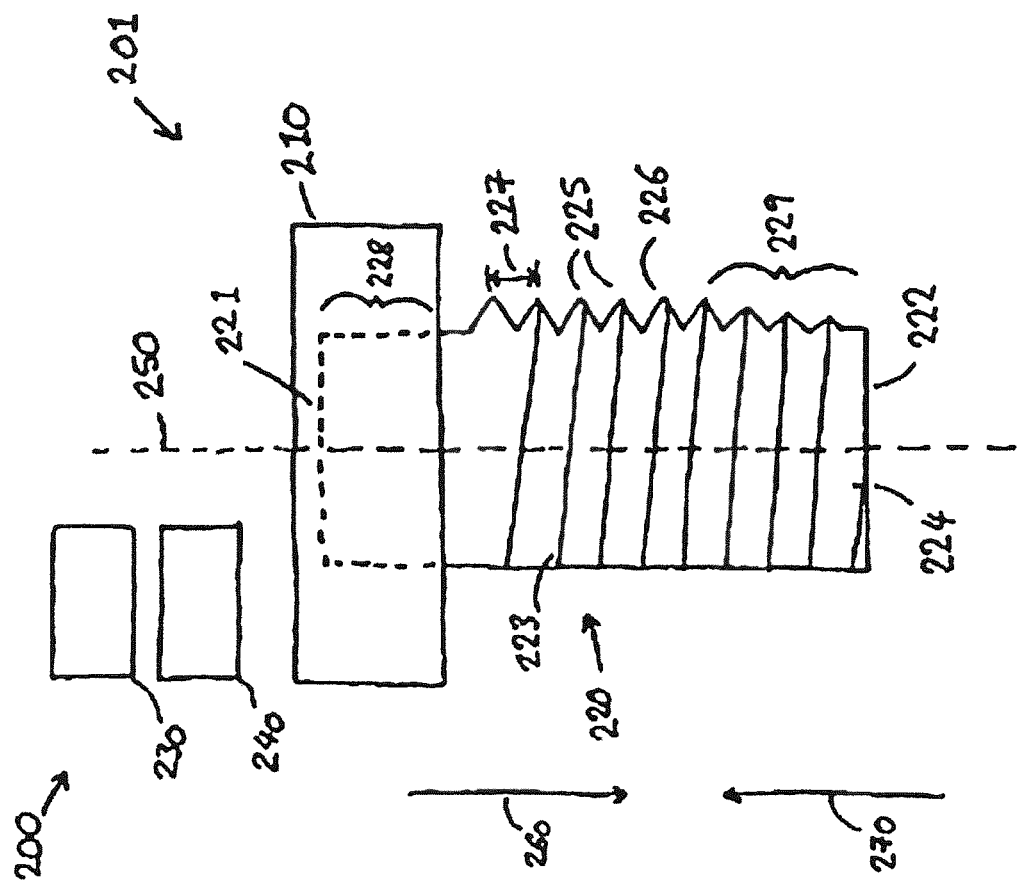
FIG. 2 illustrates an example of an apparatus.
Figure 4:
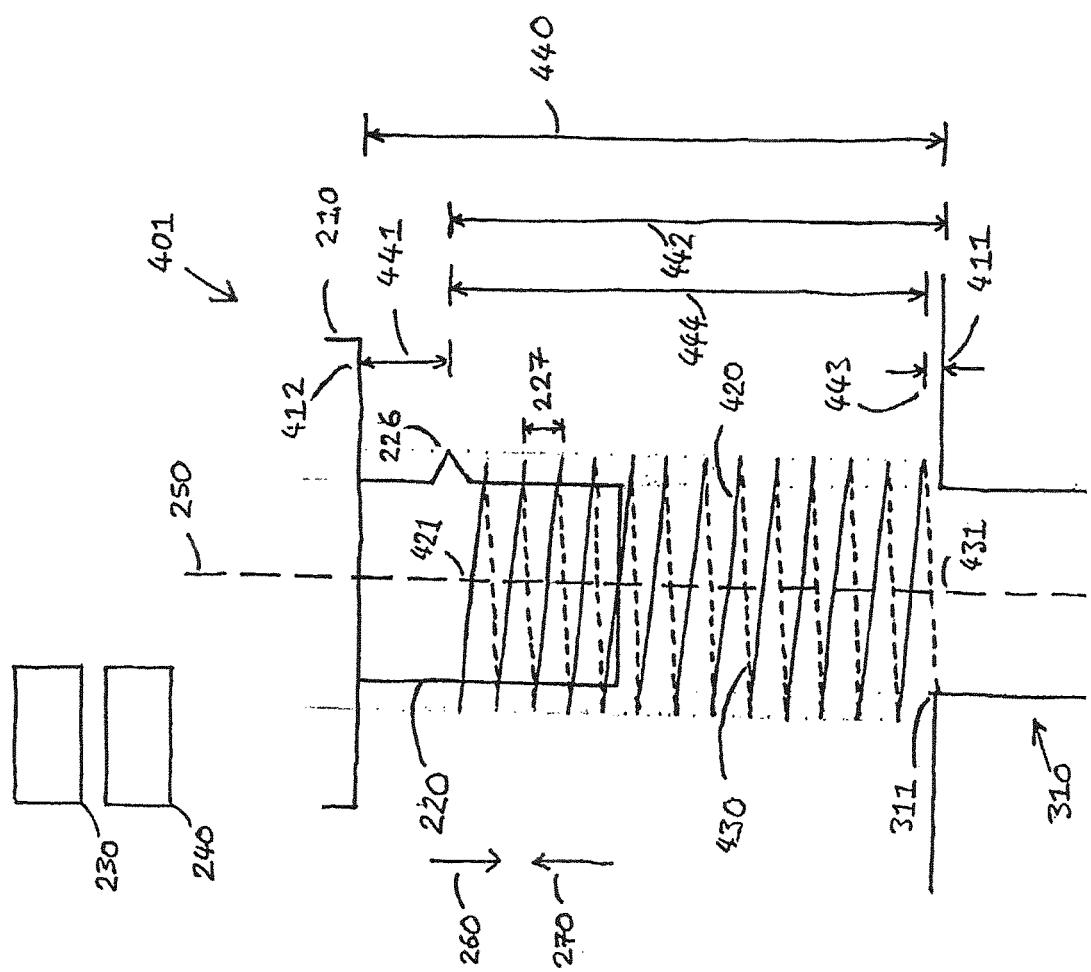
FIG. 4 illustrates an example of a first configuration of an apparatus.

FIG. 1 shows an example of a method 100 for configuring a machine for production of a thread on a workpiece. FIGS. 2 and 4 illustrate respectively examples of a machine 201 and a first configuration 401 of the machine 201.

In these examples the machine 201 comprises a tool 220 having a tool thread 223 centred on a first axis 250. The tool thread 223 comprises one or more thread-producing peaks 225 for producing a corresponding workpiece thread on a workpiece 310. The machine 201 also comprises a tool holder 210 for holding the tool 220.

The machine 201 may be a computerised numerical control (CNC) machine such as a CNC machining centre or a CNC lathe.

At block 101 of the method 100, a first distance 441 to a first thread-producing peak 226 is determined. The first distance 441 is the distance in a first direction 260, parallel to the first axis 250, from a reference position 412 of the tool holder 210 to the first thread-producing peak 226 on the tool 220 when the tool 220 is held in the tool holder 210.

At block 102 of the method 100, a first configuration 401 of the machine 201 is set. In this first configuration 401 the reference position 412 of the tool holder 210 has a displacement 440, parallel to the first axis 250, from a reference position 411 of a workpiece 310. This displacement 440 depends only upon: the determined first distance 441, from block 101; a translation 443 parallel to the first axis 250 which accounts for an angular offset between the first thread-producing peak 226 and a desired workpiece thread start position 311 on the workpiece 310; and an integer multiple 444 of the pitch 227 of the tool thread 223. The tool thread 223 and the workpiece thread created by the tool thread 223 correspond and have the same pitch 227.

Figure 3:
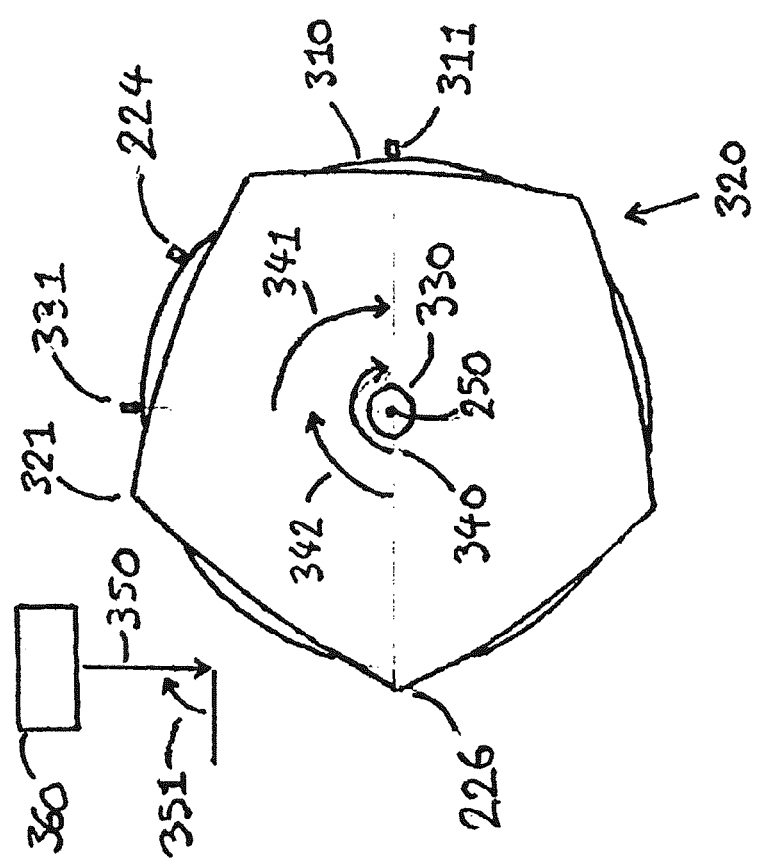
FIG. 3 illustrates an example of a plan view of the apparatus.

The angular offset 340 between the first thread-producing peak 226 and a desired thread start position 311 on the workpiece 310 is illustrated in FIG. 3.

FIG. 2 shows an example an apparatus 200 for producing a thread on a workpiece 310. In some examples, the apparatus is a machine 201 comprising the tool 220 and the tool holder 210 for holding the tool 220.

In this example, the apparatus 200 further comprises a means 230 for determining the first distance 441 to the first thread-producing peak 226 in accordance with block 101 of the method 100 shown in FIG. 1 and a means 240 for setting a first configuration 401 of the apparatus 200 in accordance with block 102 of the method 100 shown in FIG. 1.

The means 230 for determining the first distance 441 may be a measurement means. The measurement means may be a position transducer configured to measure the position of a sensor for detecting the first thread-producing peak 226. The sensor may be a camera.

The means 240 for setting the first configuration 401 may be an actuator configured to provide linear and/or rotational movement. For example, the means 240 may be a servomotor or a stepper motor.

In some examples, both means 230 and means 240 may be controlled by a controller (not shown). The controller may be a closed-loop controller such as a CNC controller.

In some examples, the tool 220 is coupled to a spindle 330 (shown in FIG. 3) of the machine 201 via the tool holder 210. The spindle 330 is centred on the first axis 250 and is rotatable about the first axis 250.

In some, but not necessarily all, examples, the tool holder 210 may be displaced only parallel to the base vectors of a Cartesian co-ordinate space. The base vectors of the Cartesian co-ordinate space are defined by a set of three mutually orthogonal unit vectors one of which is parallel to the first axis 250. The tool holder 210 may be rotatable about the first axis 250.

In this example, the tool 220 is substantially cylindrical and the longitudinal axis of the tool 220 is aligned with the first axis 250. In some examples the tool 220 is exactly cylindrical and in other examples the tool 220 may deviate slightly from a cylinder, for example the tool 220 may be frustoconical. An upper portion 228 of the tool 220 extends in a first direction 260, parallel to the first axis 250, from a first end 221 of the tool 220. A lower portion 229 of the tool 220 extends in a second direction 270, parallel to the first axis 250 and opposite the first direction 260, from a second end 222 of the tool, displaced from the first end 221 of the tool 220 along the longitudinal axis of the tool 220. In some examples, the upper portion 228 and the lower portion 229 may be separated by one or more further portions of the tool 220.

The upper portion 228 of the tool 220, adjacent the first end 221, is held by the tool holder 210. The tool 220 has a tool thread 223 which begins at a thread start position 224 at the second end 222. The tool thread 223 spirals around the first axis 250 and is substantially helical in shape. The tool thread 223 comprises a helix on the surface of the tool 220. The tool thread 223 is centred on the first axis 250. It has a constant radius measured from the first axis 250 and a constant pitch 227 measured along the first axis 250. The pitch 227 is a distance parallel to the first axis 250 between two points on the tool thread 223 that are angularly offset by an angle of $2\pi$ radians. In some examples where the tool 220 is frustoconical, the radius of the tool thread 223 is varied to match the surface of the tool 220.

The tool thread 223 may be a right-handed (RH) thread or a left-handed (LH) thread. In some examples, more than one tool thread 223 may be provided on the tool 220. The multiple threads may have the same radius and pitch but different thread start positions 224 at the second end 222 of the tool 220.

In this example, the tool 220 is a thread-forming tool. In other examples the tool 220 may be a thread-cutting tool. Thread forming produces a stronger thread than thread cutting because instead of removing material, thread forming deforms the material so that the grain of the material is aligned with the desired geometry. The material in which the thread is to be produced affects the decision as to whether thread forming or thread cutting is used. If the material is sufficiently ductile, for example aluminium and some aluminium alloys, thread forming is suitable. If the material is not sufficiently ductile, for example cast iron, thread cutting is suitable.

FIG. 3 shows an example of a plan view of the tool 220 illustrated in FIG. 2 and the workpiece 310. Although the tool holder 210 is not shown in FIG. 3, it is to be appreciated that this is only for the purpose of providing a clear illustration of a threadform 320 of the tool thread 223. The threadform 320 of the tool thread 223 is the cross-sectional shape of the tool thread 223. In this example the threadform 320 is a Reuleaux pentagon comprising five vertices 321 for each loop ($2\pi$ radians) of the tool thread 223. In other examples the threadform 320 may be: square, triangular, trapezoidal, or another Reuleaux polygon, or any shape that provides vertices 321 on the threadform 320. It is to be appreciated that FIG. 3 illustrates a flattened loop of the tool thread 223 and that in reality the illustrated vertices 321 are longitudinally displaced from each other parallel to the longitudinal axis of the tool 220 as well as angularly offset from each other around the longitudinal axis of the tool 220 so that they form the tool thread 223 on the tool 220 as a discontinuous or intermittent thread in this example.

Vertices 321 on the threadform 320 of the tool thread 223 are thread-producing peaks 225 used to produce a thread on the workpiece 310. There may be one or more thread-producing peaks 225 on the tool thread 223. These thread-producing peaks 225 produce the thread on a workpiece 310. The thread on the workpiece 310 is an internal (female) thread and the tool thread 223 on the tool 220 is an external (male) thread. The above described shapes of the threadform 320 provide an advantage in that friction between the tool 220 and the workpiece 310 during the thread-producing process is reduced because the thread production is restricted primarily to these vertices 321 (thread-producing peaks 225) because the tool thread 223 on the tool 220 is discontinuous/intermittent in this example.

In some, but not necessarily all, examples, the radii of loops of the tool thread 223 comprised in the lower portion 229 of the tool 220 adjacent to the second end 222 are smaller than the substantially constant radius of loops of the tool thread 223 not comprised in this lower portion 229 of the tool 220. This reduction in radii provides a substantially tapered lead for when the tool 220 is used to produce a thread on the workpiece 310.

The reduction of the radii of the loops of the tool thread 223 comprised in the lower portion 229 of the tool 220 may be achieved in two way or a combination of the two ways. In one example, the lower portion 229 of the tool 223 is cylindrical and the vertices 321 on the threadform 320 of the loops of the tool thread 223 comprised in the lower portion 229 of the tool 220 are smaller than vertices 321 of the threadform 320 not comprised in this lower portion 229 of the tool 220. By smaller, it is to be understood that these vertices have reduced prominence from the surface of the tool 220. In another example, the lower portion 229 of the tool 223 is frustoconical and the vertices 321 on the threadform 320 of the loops of the tool thread 223 comprised in the lower portion 229 of the tool 220 have constant prominence from the surface of the tool 220.

The first thread-producing peak 226 may be a vertex 321 not comprised in the lower portion 229 of the tool 220 or it may be any of the one or more thread-producing peaks 225 on the tool thread 223. That is, the selection of a first thread-producing peak 226 may be arbitrary. The first thread-producing peak 226 may be angularly offset from the thread start position 224 at the second end 222 of the tool 220.

In the example of FIG. 3 the first thread-producing peak 226, the thread start position 224 at the second end 222 of the tool 220, and the desired thread start position 311 on the workpiece 310 are all angularly offset from each other. It is to be appreciated that in some examples one or more of these features may have the same angular position.

The angular offset 340 between the first thread-producing peak 226 and the desired thread start position 311 on the workpiece 310 is the sum of a first angular offset 341 and a second angular offset 342.

The first angular offset 341 is the angle between a target orientation 331 of a spindle 330 in the machine 201 in the first configuration 401 and the desired thread start position 311 on the workpiece 310. This angle is measured from the target orientation 331 of the spindle 330 in the machine 201 in the first configuration 401 to the desired thread start position 311 on the workpiece 310. This angle may be set by a user of the machine 201.

The second angular offset is the angle between the first thread-producing peak 226 and the target orientation 331 of the spindle 330 in the machine 201 in the first configuration 401. This angle is measured from the first thread-producing peak 226 to the target orientation 331 of the spindle 330 in the machine 201 in the first configuration 401. The second angular offset 342 is determined by viewing the tool 220 along a third direction 350, perpendicular to the first direction 260 in order to detect a first thread-producing peak 226. The third direction 350 has a known orientation 351 relative to the target orientation 331 of the spindle 330 in the machine 201 in the first configuration 401. The tool 220 is rotated by a measured angle until the first thread-producing peak 226 is detected. Using this measured angle and the known orientation 351 of the third direction 350, the second angular offset 342 is calculated. For example, if the third direction 350 has a known orientation 351 of $\pi/4$ radians relative to the target orientation 331 of the spindle 330 in the machine 201 in the first configuration 401, the second angular offset 342 is given by the relationship: $\pi/4 \pm$ the measured angle, dependent on the direction of rotation of the tool 220.

In some, but not necessarily all, examples, the tool 220 is viewed by a camera 360 configured to capture a view along the third direction 350. The camera 360 may be disposed opposite a light source on the other side of the tool 220. A shadowgram is then formed depicting the profile of the tool 220 in silhouette. The first thread-producing peak can be identified from the shadowgram.

In some, but not necessarily all, examples, the second angular offset 342 is determined in a tool pre-setter machine. The tool pre-setter machine may be the machine 201 or may be a machine separate to the machine 201.

FIG. 4 shows an example of a first configuration 401 of the machine 201 illustrated in FIG. 2. The first configuration 401 is set by the means 240 for setting a first configuration 401 of the machine 201 in accordance with block 102 of the method 100. In this example, setting the first configuration 401 of the machine 201 comprises aligning a first virtual thread 420 and a second virtual thread 430 so that they overlap and form a single continuous virtual thread.

The first virtual thread 420 extends substantially towards the workpiece 310 from the first thread-producing peak 226 on the tool 220. The first virtual thread 420 has a first thread axis 421 extending in the first direction 260 and aligned with the first axis 250. The second virtual thread 430 extends substantially towards the tool 220 from the desired thread start position 311 on the workpiece 310. The second virtual thread 430 has a second thread axis 431 extending in a second direction 270, opposite the first direction 260, and aligned with the first thread axis 250. The first virtual thread 420 and second virtual thread 430 have the same pitch, that being the pitch 227 of the tool thread 223 on the tool 220 and the same radius.

The first virtual thread 420 and the second virtual thread 430 are aligned when a point on the first virtual thread 420 and a point on the second virtual thread 430, having an angle between each other of $2n\pi$ radians (where n is an integer), are separated by an integer multiple 444 of the pitch 227. In this example the integer multiple 444 of the pitch 227 may be between 2 and 5, between 2 and 7, between 5 and 7, or any subrange of these ranges.

The first thread-producing peak 226, from which the first virtual thread 420 extends, and the desired first start position 420 on the workpiece 310, from which the second virtual thread 430 extends, have an angular offset 340. In this example, aligning the first virtual thread 420 and the second virtual thread 430 comprises performing a translation 443 of the tool 220 parallel to the first axis 250 to account for the angular offset 340 between the first thread-producing peak 226 and the desired thread start position on the workpiece 310.

Pitch and angle are related as described hereinbefore in that the pitch 227 is distance parallel to the first axis 250 between two points on the tool thread 223 that are angularly offset by an angle of 2π radians. In this example, the angular offset 340 between the first thread-producing peak 226 and the desired thread start position 311 on the workpiece 310 can be converted from an angle 340 into a base unit of the pitch 227. Once the angular offset 340 is known in a base unit of the pitch 227, a translation 443 may be added to the integer multiple 444 of the pitch 227 to determine the distance 442, parallel to the first axis 250, between the first thread-producing peak 226 and the thread start position 311 on the workpiece 310 at which the first virtual thread 420 and the second virtual thread 430 are aligned—so that they overlap and form a single continuous virtual thread.

In this example, the first configuration 401 of the machine 201 is set with a displacement 440 of the reference position 412 of the tool holder 210 from the reference position 411 of the workpiece 310.

The desired start position 311 on the workpiece 310 and the reference position 411 of the workpiece 310 are comprised in a first plane orthogonal to the first axis 250. Therefore the distance 442, parallel to the first axis 250, between the first thread-producing peak 226 and the desired thread start position 311 is the same as the distance, parallel to the first axis 250, between the first thread-producing peak 226 and the reference position 411 of the workpiece 310. It is to be appreciated that the reference position 411 of the workpiece 310 may not be disposed on the workpiece 310. For example, the workpiece 310 may be a bore in a planar surface; the desired thread start position 311 may be disposed on the bore and the planar surface; and the reference position 411 may be disposed on the planar surface and not the bore.

To determine the displacement 440 of the reference position 412 of the tool holder 210 from the reference position 411 of the workpiece 310, the first distance 441 from the reference position of the tool holder 210 to the first thread-producing peak 226 is added to the distance 442, parallel to the first axis 250, between the first thread-producing peak 226 and the desired thread start position 311 on the workpiece 310. The first distance 441 is determined by the means 230 for determining the first distance 441 to the first thread-producing peak 226 in accordance with block 102 of the method 100.

In this example, no other measurement is required, and no other measurement is made, for the purpose of setting the first configuration 401. For example, the length of the tool 220 from the reference position 412 of the tool holder 210 to the second end 222 of the tool 220 is not measured.

The method 100 hereinbefore described has numerous applications where a thread must be reliably and repeatedly produced with a specific start position within the confines of the exacting requirements of mass production.

Figure 5:
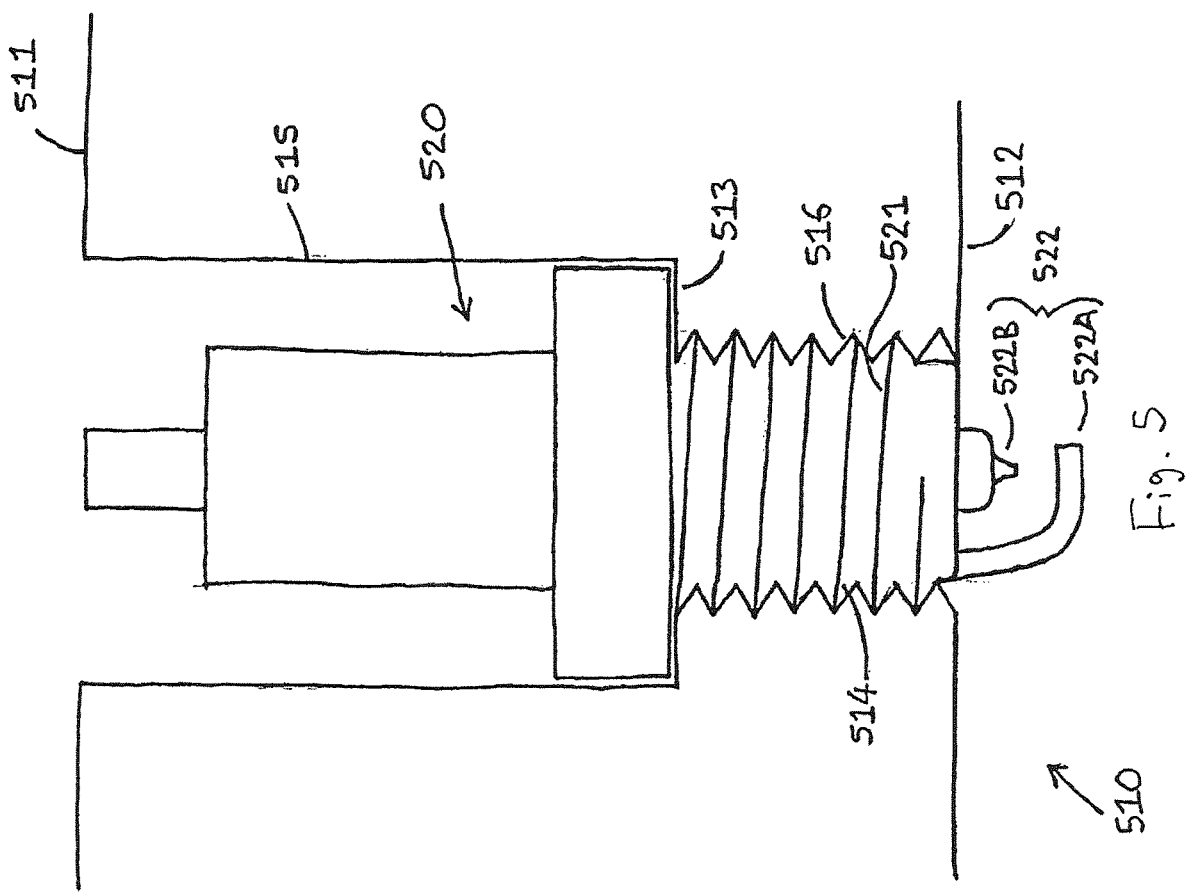
FIG. 5 illustrates an example of a spark plug in an engine cylinder head.

FIG. 5 shows an example of one of the applications of method 100. In particular FIG. 5 shows an example of a spark plug 520 arranged within an engine cylinder head 510. The spark plug 520 comprises electrodes 522A, 522B with predetermined angular positions with respect to a thread 521 on the spark plug 520. The engine cylinder head 510 comprises a first bore 514 which extends in one direction to a fire surface 512 of the engine cylinder head 510 and in another opposite direction to a seating face 513. The seating face 513 is comprised in a second bore 515 with a larger radius that the first bore 514. The second bore 515 extends from the seating face 513 to an outer surface 511 of the engine cylinder head 520. The first bore 514 and the second bore 515 are centred on the same axis. In some examples, the first bore 514 and the second bore 515 are centred on different axes and the first bore 514 still extends to the seating face 513 comprised in the second bore 515.

The outer surface 511 may be an outer surface of the cylinder head cover or it may be any surface on the outside of the cylinder head from which the combustion chamber may be directly reached by a linear bore.

The bore 514 has a bore thread 516 with a thread start position (not shown). The thread 516 is a workpiece thread formed by a tool 220 as described above.

The thread start position of the bore thread 516 is determined such that when the spark plug 520 is screwed into the bore 514 with a given tightness a ground electrode 522A has a desired orientation with respect to the direction of sprays of fuel from a fuel injector. This desired orientation of the ground electrode 552A of the spark plug 520 ensures that the spray of fuel does not come into contact with the ground electrode 522A. Fuel coming into contact with the ground electrode 552A of the spark plug 520 may result in the spark plug 520 misfiring.

Figure 6:
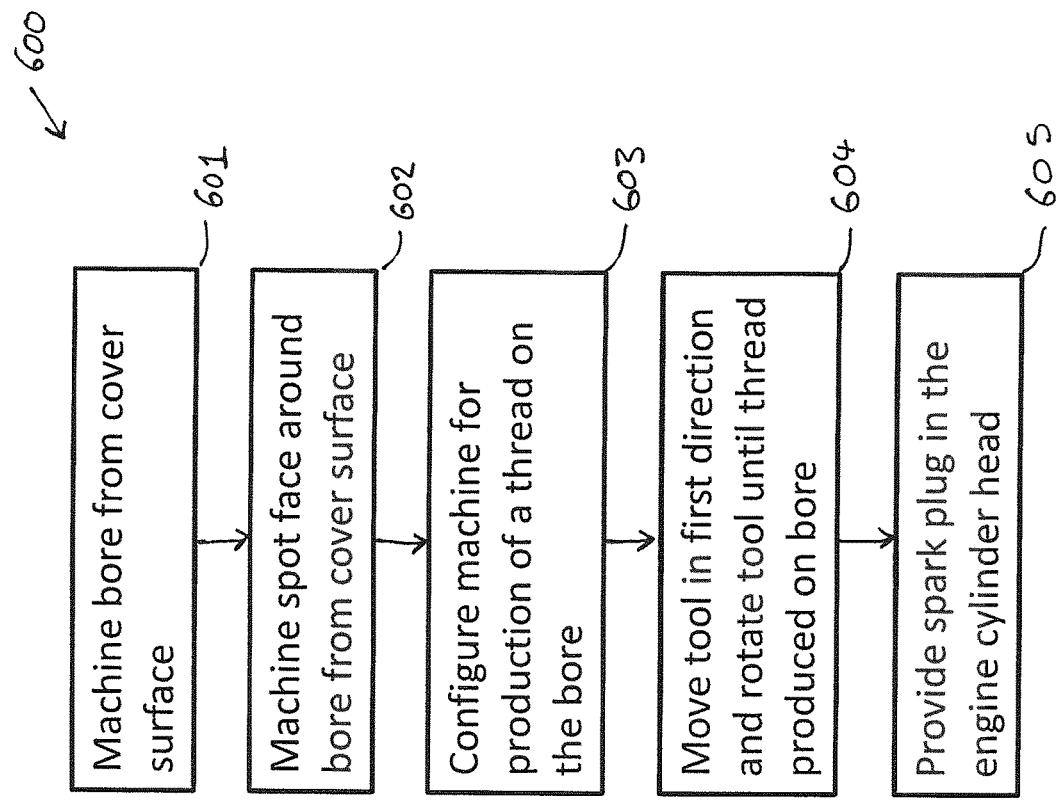
FIG. 6 illustrates an example of a method of providing a spark plug in an engine cylinder head.

FIG. 6 shows an example of a method 600 for arranging the position of a spark plug 520 at a predetermined angular position in an engine cylinder head 510 of an internal combustion engine.

At block 601 of the method 600, the first bore 514 is machined from the outer surface 511 of the engine cylinder head 510. The first bore 514 may be produced by a drilling or boring tool.

At block 602 of the method 600, the seating face 513 is produced around the first bore 514 by machining the second bore 515 from the outer surface 511 of the engine cylinder head 510. The second bore 515 may be produced by a drilling or boring tool.

In some examples, block 601 and block 602 of the method 600 are combined to machine the first bore 514 and second bore 515. This may reduce machine cycle time. In some examples, block 601 and block 602 of the method 600 are combined using a two-part drilling or boring tool comprises a first part which performs block 601 of the method 600 and a second part which performs block 602 of the method 600. The first part and second part of the two-part drilling or boring tool are centered on the same axis and are configured to move, translationally and rotationally, together. The bore-producing means on the second part is separated from the bore-producing means on the first part by at least the desired length of the first bore 514.

Alternatively, in some examples, the seating face 513 may be produced by milling the second bore 515 from the outer surface 511 of the engine cylinder head 510 using a milling tool. The milling tool may be held by the tool holder 210.

The milling tool for producing the seating face 513 may be replaced with the tool 220 for producing the thread 516 if the thread 516 is to be produced by thread forming or thread cutting.

It is to be appreciated that the first bore 514 may be machined from the fire surface 512 of the engine cylinder head 510. In this instance, the engine cylinder head 510 is turned so that the tool 220 can access the outer surface of the engine cylinder head 510. However, if the first bore 514 and the second bore 515 are machined from the same surface (e.g., the outer surface 511), the engine cylinder head 510 does not need to be turned. This saves machine cycle time and improves the accuracy with which features of the engine cylinder head 510 are produced relative to each other.

At block 603 of the method 600, the machine 201 is configured for production of the thread 516 on the first bore 514 in accordance with the method 100. In this example, the first bore 514 is the workpiece 310 and the first bore 514 and the second bore 515 are centred on the first axis 250. The thread 516 is a workpiece thread created by the tool thread 223 of the tool 220.

At block 604 of the method 600, the tool 220 and the tool holder 210 are moved in the first direction 260 from the first configuration 401 towards the first bore 514 along the first axis 250. For every distance of one pitch 227 the tool 220 is moved along the first axis 250, the tool 220 is configured to perform one complete rotation ($2\pi$ radians) about the first axis 250. The tool 220 is moved in this way until the thread 516 is produced.

At block 605 of the method 600, a spark plug 520 as described hereinbefore is provided and is screwed into the engine cylinder head 510 to a given tightness.

Figure 7:
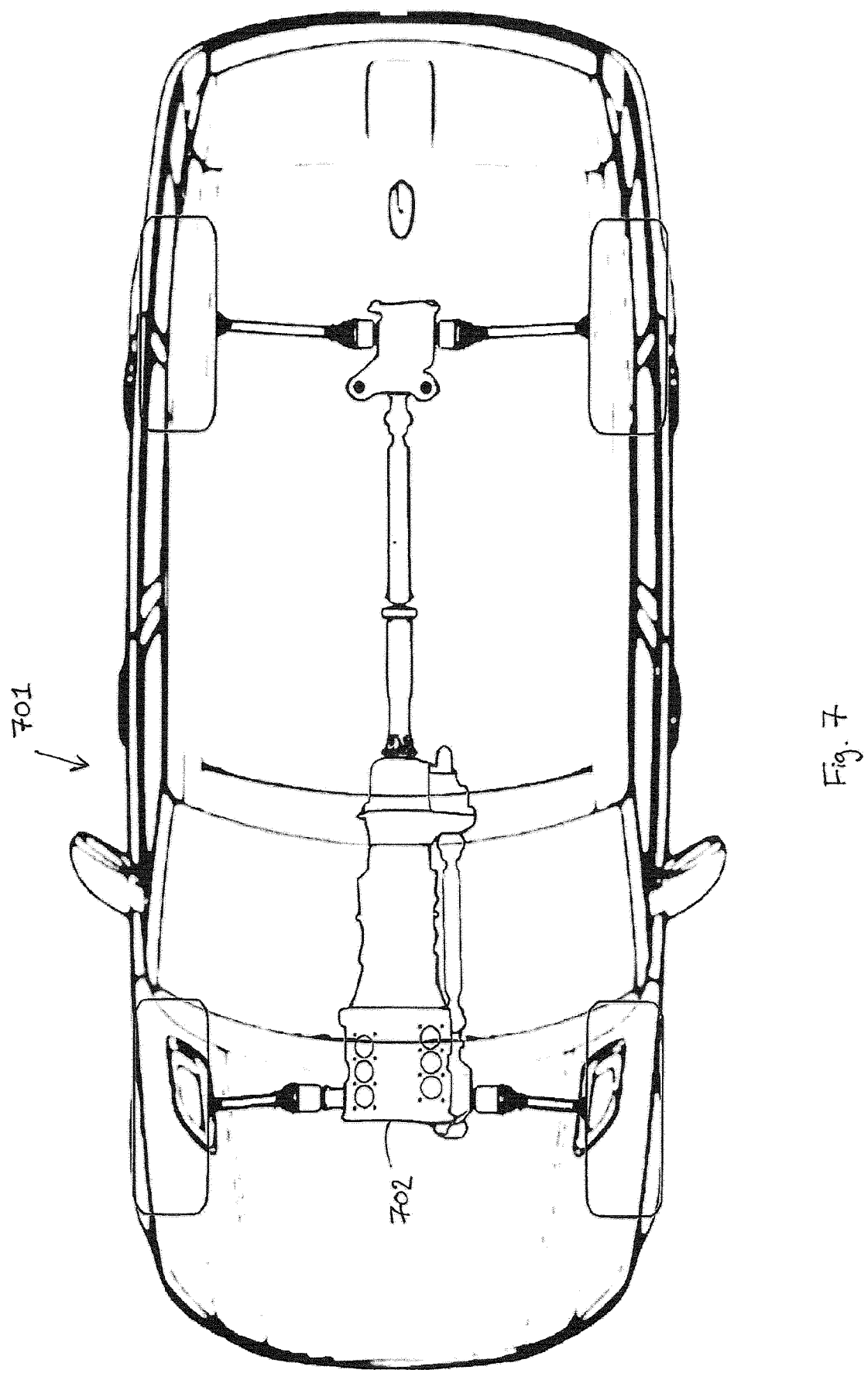
FIG. 7 illustrates an example of a vehicle.

FIG. 7 shows an example of a vehicle 701 comprising an internal combustion engine 702 comprising the engine cylinder head 510 and the spark plug 520. A method of manufacturing the vehicle 701 comprises a method of manufacturing the internal combustion engine 702. The method of manufacturing the internal combustion engine 702 comprises producing the thread 516 in the first bore 514 of the engine cylinder head 510.

Figure 8:
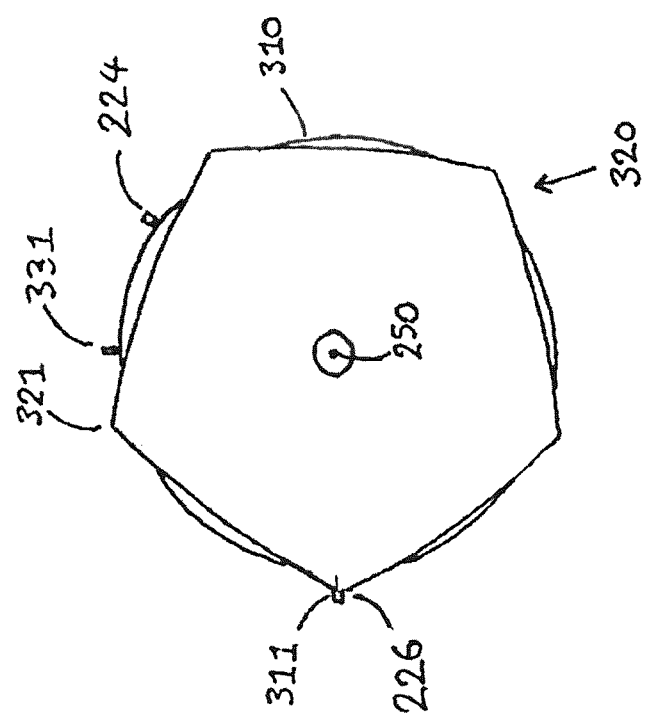
FIG. 8 illustrates an example of a plan view of the apparatus.

FIG. 8 shows an example of a plan view of the apparatus when an alternative method of configuring the machine 201 for production of a thread, having the pitch 227, on the workpiece 310 is used. In this alternative method the first configuration 401 of the machine 201 is set such that the reference position 412 of the tool holder 210 has a displacement 440 parallel to the first axis 250 from the reference position 411 of the workpiece 310 depending only upon: the determined first distance 441 from the reference position 412 of the tool holder 210 to the first thread-producing peak 226 on the tool 220 when said tool 220 is held in the tool holder 210; and an integer multiple 444 of the pitch 227. A target orientation 331 of the spindle 330 in the first configuration 401 is set such that an angular offset 340 between the first thread-producing peak 226 and a desired thread start position 311 on the workpiece 310 is a multiple of $2\pi$ radians.

For purposes of this disclosure, it is to be understood that the term "angularly offset" refers to an angular separation other than $2n\pi$ radians, unless otherwise stated (where n is an integer).

For purposes of this disclosure, it is to be understood that the controller(s) described herein can each comprise a control unit or computational device having one or more electronic processors. A machine and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in FIGS. 1 and 6 may represent steps in a method and/or sections of code in a computer program (not shown). The illustration of a particular order to the blocks does not necessarily imply that there is a required or preferred order for the blocks and the order and arrangement of the block may be varied. Furthermore, it may be possible for some steps to be omitted or combined.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of configuring a machine for production of a thread, having a pitch, on a workpiece, the machine comprising:
   a tool having a thread centered on a first axis and comprising one or more thread-producing peaks for producing the thread having the pitch; and
   a tool holder holding the tool, the method comprising:
   determining a first distance, in a first direction parallel to the first axis, from a reference position of the tool holder to a first thread-producing peak on the tool when said tool is held in the tool holder; and
   setting a first configuration of the machine wherein the reference position of the tool holder has a displacement parallel to the first axis from a reference position of the workpiece depending only upon:

the determined first distance;
a translation parallel to the first axis to account for an angular offset between the first thread-producing peak and a desired thread start position on the workpiece; and
an integer multiple of the pitch.

2. A method as claimed in claim 1, wherein the pitch is a distance, parallel to the first axis, between two points on the thread angularly offset by an angle of 2π radians.

3. A method as claimed in claim 1, wherein the first thread-producing peak is any one of the one or more thread-producing peaks.

4. A method as claimed in claim 1, wherein the desired thread start position on the workpiece and the reference position of the workpiece are in a first plane that is orthogonal to the first axis.

5. A method as claimed in claim 1, wherein setting the first configuration of the machine includes measuring only the first distance and the angular offset between the first thread-producing peak and the desired thread start position on the workpiece without any further measurements.

6. A method as claimed in claim 1, wherein the tool has a first end and a second end, wherein a portion adjacent the first end is configured to be held by the tool holder, and wherein a thread start position on the tool at the second end of the tool is angularly offset relative to the first thread-producing peak.

7. A method as claimed in claim 1, wherein the angular offset between the first thread-producing peak and the desired thread start position on the workpiece is the sum of:
a first angular offset between a target orientation of a spindle in the machine in the first configuration and the desired thread start position on the workpiece; and
a second angular offset between the first thread-producing peak and the target orientation of the spindle in the machine in the first configuration.

8. A method as claimed in claim 7, wherein the second angular offset is determined by:
viewing the tool along a third direction, perpendicular to the first direction, to detect the first thread-producing peak, wherein the third direction has a known orientation relative to the target orientation of the spindle in the machine in the first configuration;
rotating the tool by a measured angle until the first thread-producing peak is detected; and
using the measured angle and the known orientation of the third direction relative to the target orientation of the spindle in the machine in the first configuration to calculate the second angular offset.

9. A method as claimed in claim 7, wherein the second angular offset is determined in a tool pre-setter machine.

10. A method as claimed in claim 1, comprising moving the tool and the tool holder from the first configuration in the first direction toward the workpiece along the first axis and wherein, for every distance of one pitch the tool is moved along the first axis, the tool is configured to perform one complete rotation about the first axis.

11. A method as claimed in claim 1, comprising aligning a first virtual thread and a second virtual thread, the first virtual thread extending from the first thread-producing peak on the tool and having a first thread axis extending in the first direction and aligned with the first axis, and the second virtual thread extending from the desired thread start position on the workpiece and having a second thread axis extending in a second direction, opposite the first direction, and aligned with the first axis, and wherein a pitch of the first virtual thread and a pitch of the second virtual thread are the same.

12. A method as claimed in claim 1, wherein the tool holder is moveable only parallel to base vectors of a Cartesian co-ordinate space and is rotatable about the first axis.

13. A method as claimed in claim 1, wherein the workpiece comprises a bore, wherein the bore is a first bore in an engine cylinder head, and wherein the first bore in the engine cylinder head is configured to receive a spark plug.

14. A non-transitory computer-readable medium containing a computer program, which, when run on a computer, performs the method of claim 1.

15. A method of arranging the position of a spark plug at a predetermined angular position in a cylinder head of an internal combustion engine, comprising:
providing spark plugs with predetermined angular positions of ground electrodes with respect to a thread employed to secure the spark plug in the cylinder head; and
producing a bore in the cylinder head to receive said spark plugs, said bore having a thread with a predetermined desired thread start position and a pitch, wherein producing the bore is performed by a machine comprising a tool holder and a tool having a thread centered on a first axis and one or more thread-producing peaks for producing the thread;
wherein the tool has a first end and a second end, wherein a portion adjacent the first end is configured to be held by the tool holder, and wherein a thread start position on the tool at the second end of the tool is angularly offset relative to the first thread-producing peak;
wherein there is a first distance, in a first direction parallel to the first axis, from a reference position of the tool holder to a first thread-producing peak on the tool when said tool is held in the tool holder; and
wherein there is a first configuration of the machine wherein the reference position of the tool holder has a displacement parallel to the first axis from a reference position of the cylinder depending only upon:
the first distance;
a translation parallel to the first axis to account for an angular offset between the first thread-producing peak and a desired thread start position on the cylinder; and
an integer multiple of the pitch.

16. A method of manufacturing an engine comprising:
producing a thread in a bore of an engine cylinder head;
wherein producing the bore is performed by a machine comprising a tool holder and a tool having a thread centered on a first axis and one or more thread-producing peaks for producing the thread;
wherein there is a first distance, in a first direction parallel to the first axis, from a reference position of the tool holder to a first thread-producing peak on the tool when said tool is held in the tool holder; and
wherein there is a first configuration of the machine wherein the reference position of the tool holder has a displacement parallel to the first axis from a reference position of the cylinder depending only upon:
the first distance;
a translation parallel to the first axis to account for an angular offset between the first thread-producing peak and a desired thread start position on the cylinder; and
an integer multiple of the pitch; and wherein the angular offset between the first thread-producing peak and the desired thread start position on the engine cylinder head is the sum of:
a first angular offset between a target orientation of a spindle in the machine in the first configuration and the desired thread start position on the engine cylinder head; and
a second angular offset between the first thread-producing peak and the target orientation of the spindle in the machine in the first configuration.

\* \* \* \* \*